United States Patent
Kim et al.

(10) Patent No.: US 10,992,919 B2
(45) Date of Patent: *Apr. 27, 2021

(54) PACKED IMAGE FORMAT FOR MULTI-DIRECTIONAL VIDEO

(71) Applicant: Apple Inc., Cupertino, CA (US)

(72) Inventors: Jae Hoon Kim, San Jose, CA (US); Ming Chen, Cupertino, CA (US); Xiaosong Zhou, Campbell, CA (US); Hsi-Jung Wu, San Jose, CA (US); Dazhong Zhang, Milpitas, CA (US); Hang Yuan, San Jose, CA (US); Jiefu Zhai, San Jose, CA (US); Chris Y. Chung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,245

(22) Filed: Dec. 23, 2019

(65) Prior Publication Data

US 2020/0213571 A1    Jul. 2, 2020

Related U.S. Application Data

(63) Continuation of application No. 15/638,709, filed on Jun. 30, 2017, now Pat. No. 10,523,913.

(51) Int. Cl.
| | |
|---|---|
| *H04N 13/161* | (2018.01) |
| *H04N 19/597* | (2014.01) |
| *H04N 19/70* | (2014.01) |
| *H04N 5/232* | (2006.01) |
| *H04N 13/243* | (2018.01) |
| *H04N 13/139* | (2018.01) |

(52) U.S. Cl.
CPC ....... *H04N 13/161* (2018.05); *H04N 5/23238* (2013.01); *H04N 13/243* (2018.05); *H04N 19/597* (2014.11); *H04N 19/70* (2014.11); *H04N 13/139* (2018.05)

(58) Field of Classification Search
CPC .. H04N 13/161; H04N 13/243; H04N 19/597; H04N 19/70; H04N 5/23238; H04N 13/139
See application file for complete search history.

(56) References Cited

U.S. PATENT DOCUMENTS

| | | | |
|---|---|---|---|
| 10,523,913 B2* | 12/2019 | Kim | H04N 13/243 |
| 2016/0012855 A1 | 1/2016 | Krishnan | |
| 2017/0200255 A1 | 7/2017 | Lin et al. | |
| 2017/0280126 A1 | 9/2017 | Van der Auwera et al. | |
| 2018/0184121 A1 | 6/2018 | Kim et al. | |
| 2018/0249164 A1 | 8/2018 | Kim et al. | |
| 2018/0376126 A1 | 12/2018 | Hannuksela | |
| 2020/0092582 A1* | 3/2020 | Xiu | G06T 3/0087 |

* cited by examiner

*Primary Examiner* — Phuoc Tran
(74) *Attorney, Agent, or Firm* — BakerHostetler

(57) ABSTRACT

Frame packing techniques are disclosed for multi-directional images and video. According to an embodiment, a multi-directional source image is reformatted into a format in which image data from opposing fields of view are represented in respective regions of the packed image as flat image content. Image data from a multi-directional field of view of the source image between the opposing fields of view are represented in another region of the packed image as equirectangular image content. It is expected that use of the formatted frame will lead to coding efficiencies when the formatted image is processed by predictive video coding techniques and the like.

12 Claims, 11 Drawing Sheets

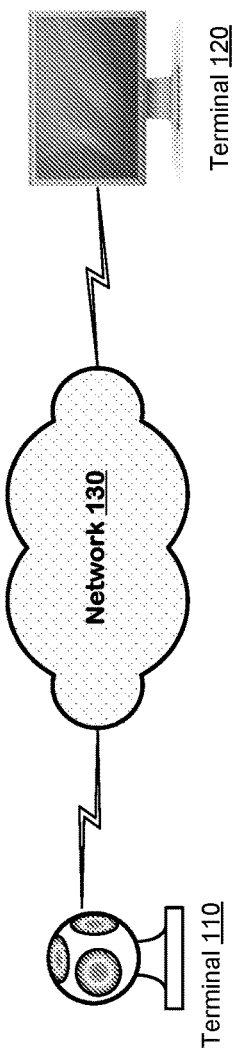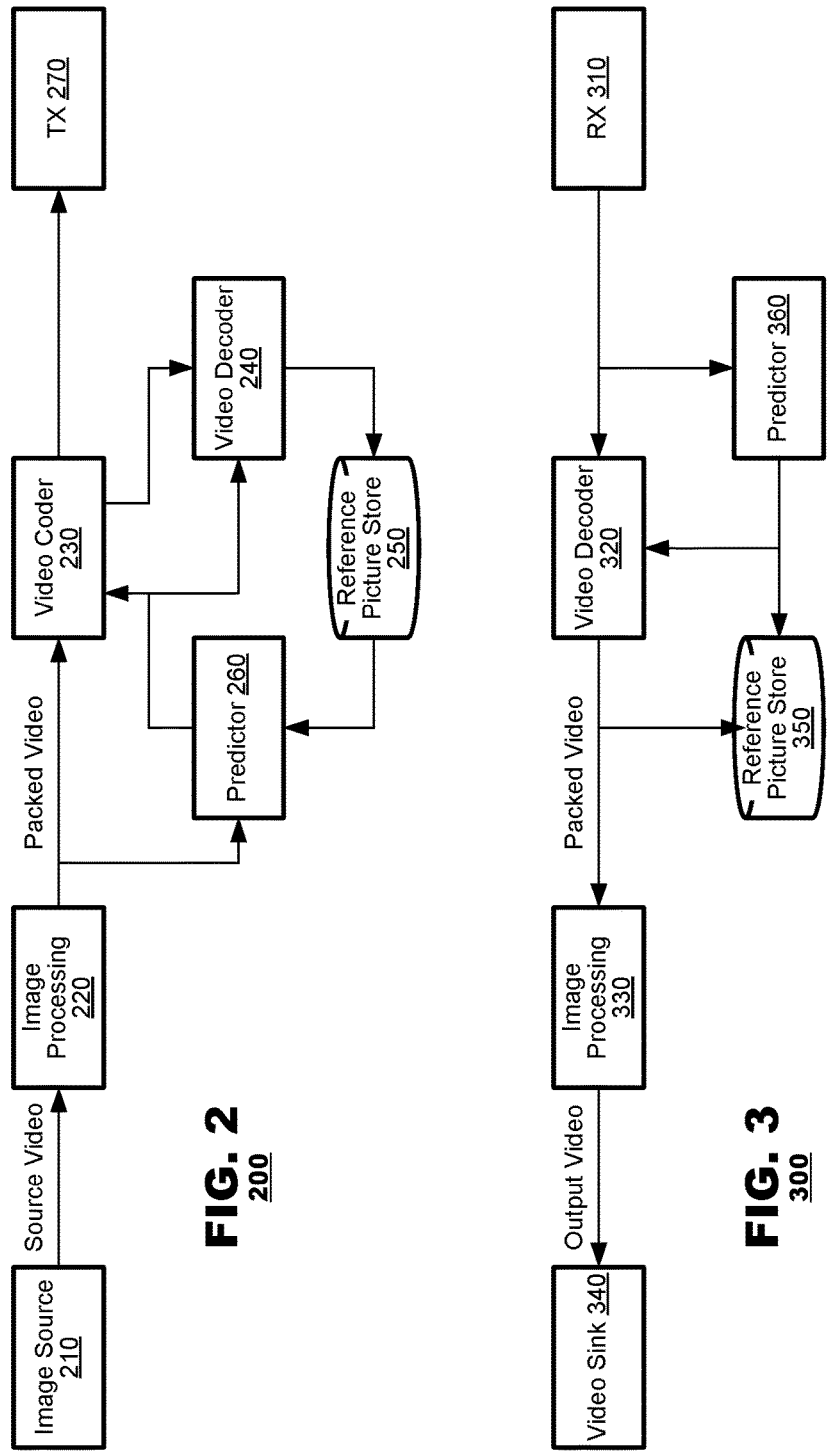
FIG. 1
100
FIG. 2
200
FIG. 3
300

400

500

600

700

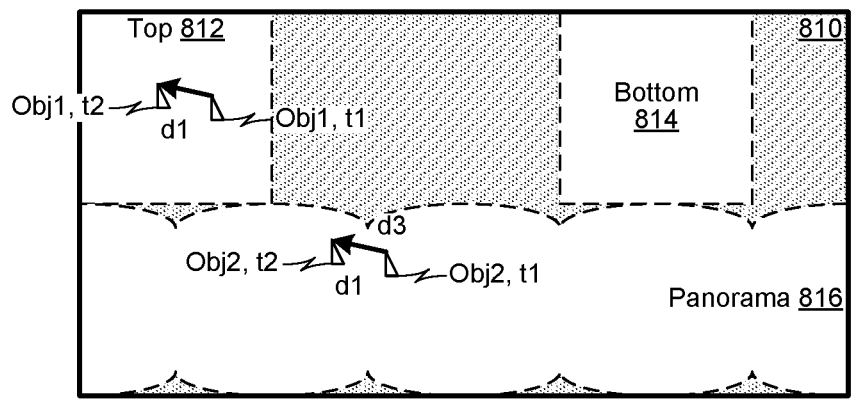
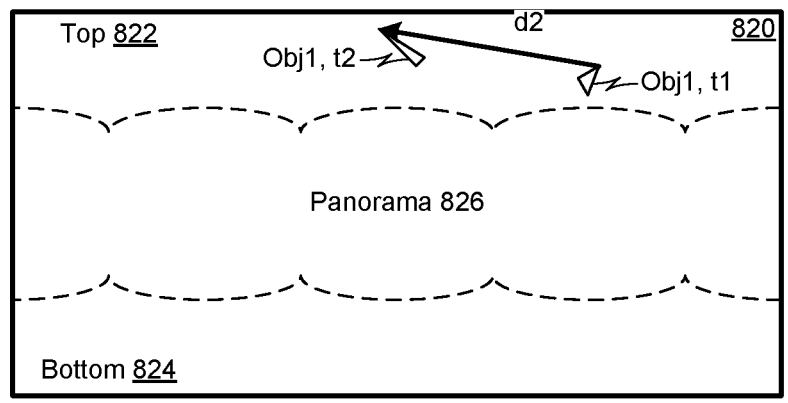
FIG. 8
800
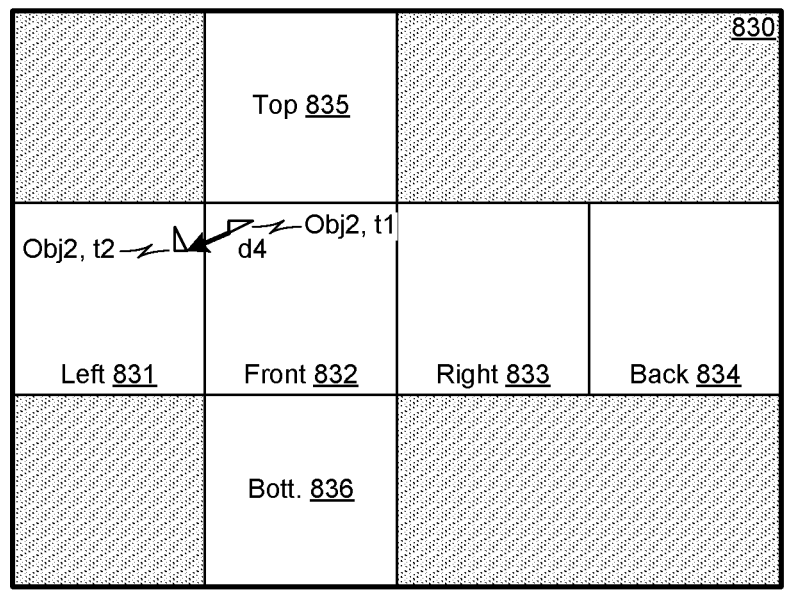

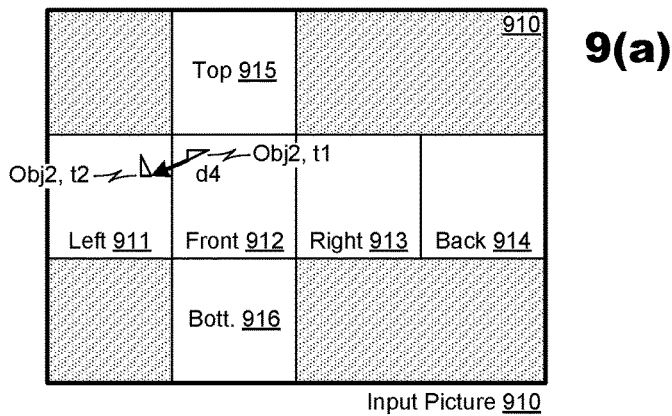
9(a)
FIG. 9
900
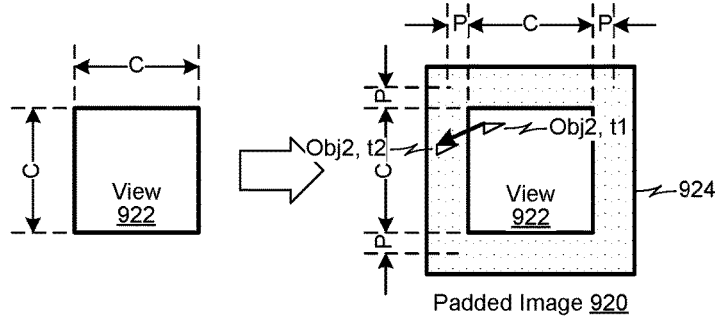
9(b)
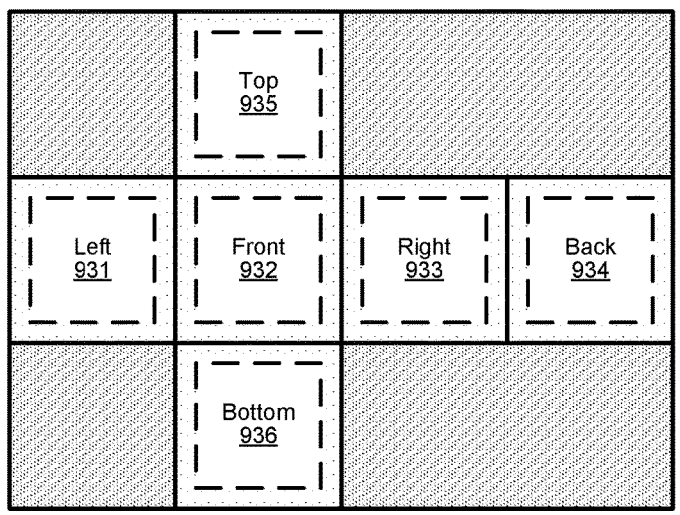
9(c)

10(a)
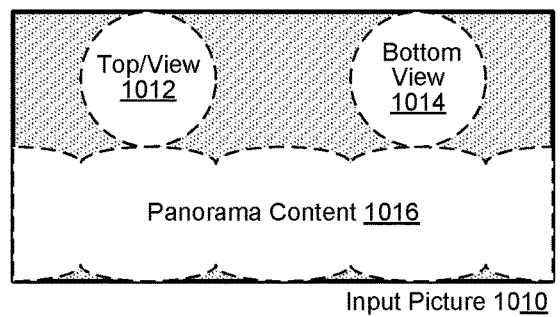
Input Picture 1010
FIG. 10
10(b)
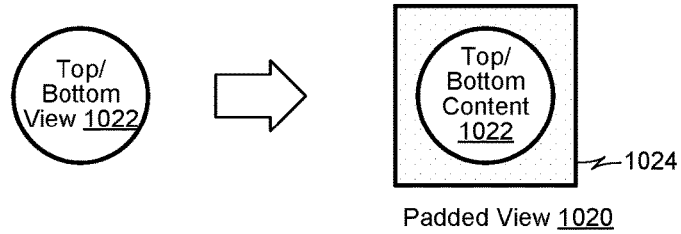
Padded View 1020
10(c)
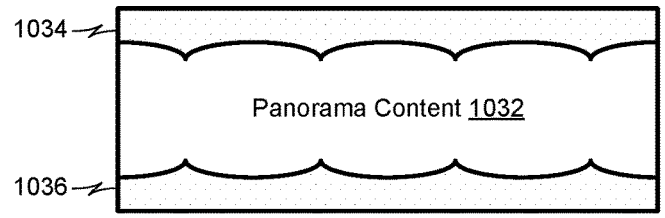
Padded Picture 1040
10(d)
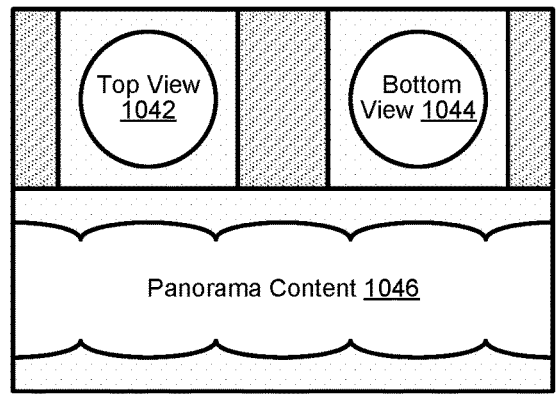

1100

1200

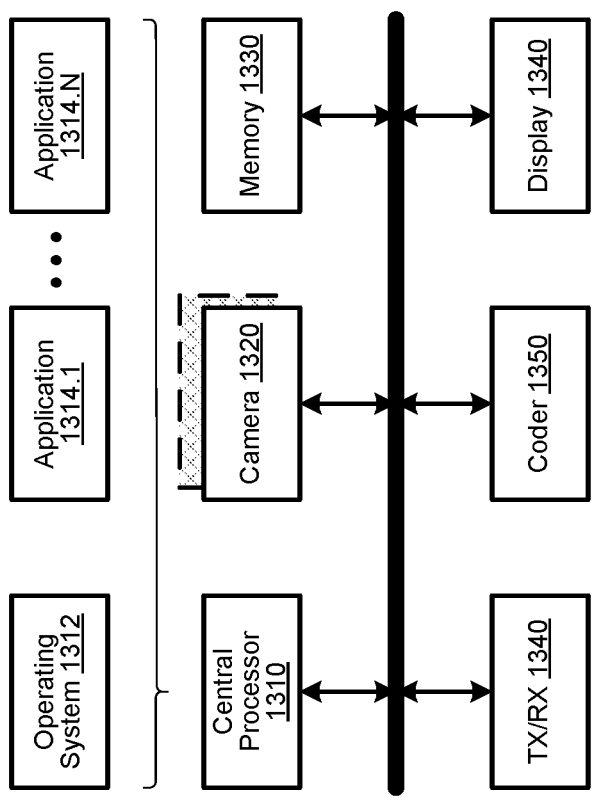

PACKED IMAGE FORMAT FOR MULTI-DIRECTIONAL VIDEO

BACKGROUND

The present disclosure relates to coding techniques for omnidirectional and multi-directional images and videos.

Some modern imaging applications capture image data from multiple directions about a camera. Some cameras pivot during image capture, which allows a camera to capture image data across an angular sweep that expands the camera's effective field of view. Some other cameras have multiple imaging systems that capture image data in several different fields of view. In either case, an aggregate image may be created that represents a merger or "stitching" of image data captured from these multiple views.

Many modern coding applications are not designed to process such omnidirectional or multi-directional image content. Such coding applications are designed based on an assumption that image data within an image is "flat," that the image data represents a captured field of view in a planar projection. Thus, the coding applications do not account for image distortions that can arise when processing these omnidirectional or multi-directional images with the distortions contained within them. These distortions can cause ordinary video coders to fail to recognize redundancies in image content, which leads to inefficient coding.

Accordingly, the inventors perceive a need in the art for image formatting techniques that can lead to higher coding efficiencies when omnidirectional and multi-directional image content are coded for delivery to other devices.

BRIEF DESCRIPTION OF THE DRAWINGS

FIG. 1 illustrates a system for use with embodiments of the present disclosure.

FIG. 2 is a functional block diagram of a coding system according to an embodiment of the present disclosure.

FIG. 3 is a functional block diagram of a decoding system according to an embodiment of the present disclosure.

FIG. 8 figuratively illustrates coding efficiencies that are expected to be realized from use of frames according to embodiments of the present disclosure.

FIG. 9 illustrates a prediction technique according to an embodiment of the present disclosure.

FIG. 10 illustrates padding operations according to an embodiment of the present disclosure.

FIG. 13 illustrates a computer system suitable for use with embodiments of the present disclosure.

DETAILED DESCRIPTION

Figure 4:
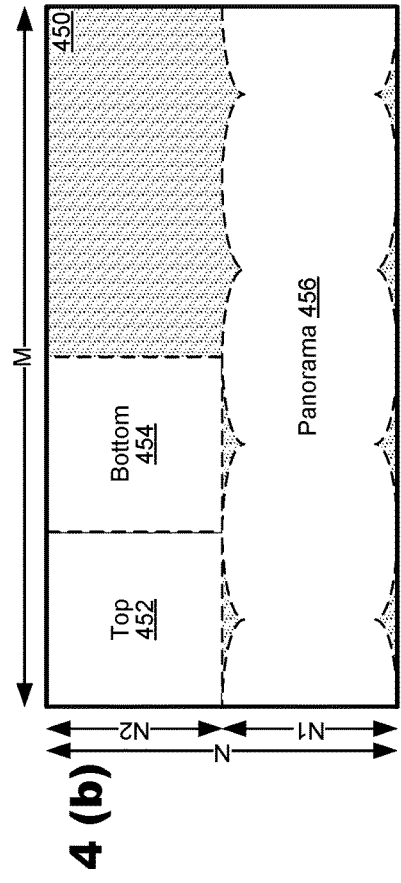
FIG. 4 illustrates image capture operations of an image source according to an embodiment of the present disclosure.
Figure 4:
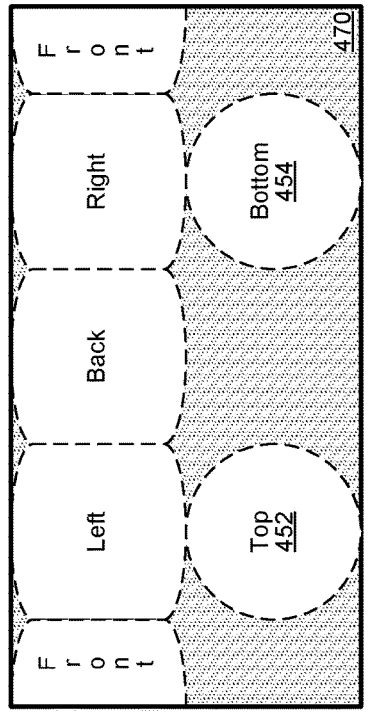
Figure 4:
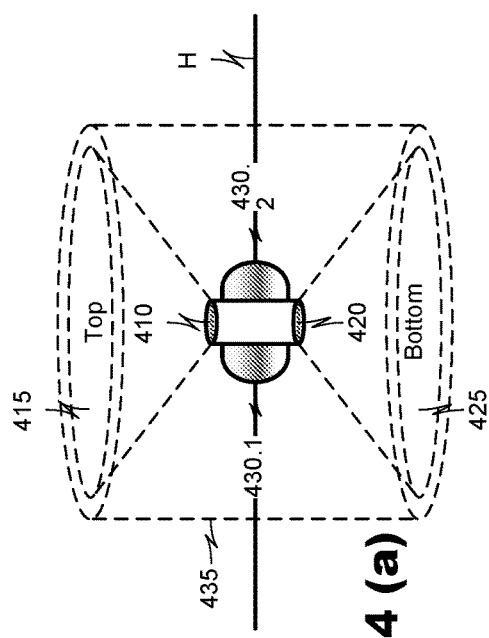
Figure 4:
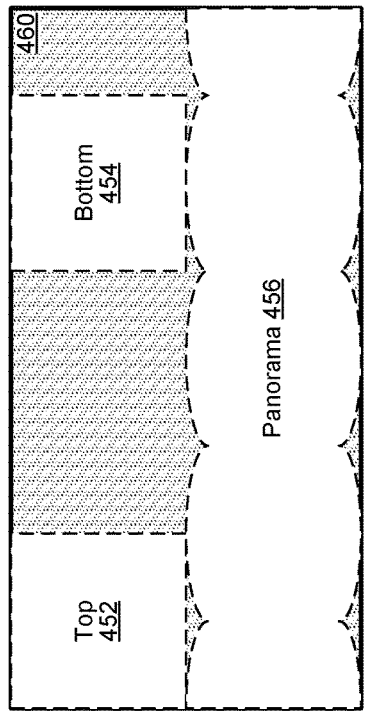

Embodiments of the present disclosure provide frame formatting techniques for multi-directional images and video. According to an embodiment, a multi-directional source image is assembled into a format in which image data from opposing fields of view are represented in respective regions of the packed image as flat image content. Image data from a multi-directional field of view of the source image between the opposing fields of view are represented in another region of the packed image as equirectangular image content. It is expected that use of the formatted frame will lead to coding efficiencies when the formatted image is processed by predictive video coding techniques and the like.

FIG. 1 illustrates a system 100 in which embodiments of the present disclosure may be employed. The system 100 may include at least two terminals 110-120 interconnected via a network 130. The first terminal 110 may have an image source that generates multi-directional and omnidirectional video. The terminal 110 also may include coding systems and transmission systems (not shown) to transmit coded representations of the multi-directional video to the second terminal 120, where it may be consumed. For example, the second terminal 120 may display the multi-directional video on a local display, it may execute a video editing program to modify the multi-directional video, or may integrate the multi-directional video into an application (for example, a virtual reality program), may present in head mounted display (for example, virtual reality applications) or it may store the multi-directional video for later use.

FIG. 1 illustrates components that are appropriate for unidirectional transmission of multi-directional video, from the first terminal 110 to the second terminal 120. In some applications, it may be appropriate to provide for bidirectional exchange of video data, in which case the second terminal 120 may include its own image source, video coder and transmitters (not shown), and the first terminal 110 may include its own receiver and display (also not shown). If it is desired to exchange multi-directional video bidirectionally, then the techniques discussed hereinbelow may be replicated to generate a pair of independent unidirectional exchanges of multi-directional video. In other applications, it would be permissible to transmit multi-directional video in one direction (e.g., from the first terminal 110 to the second terminal 120) and transmit "flat" video (e.g., video from a limited field of view) in a reverse direction.

In FIG. 1, the second terminal 120 is illustrated as a computer display but the principles of the present disclosure are not so limited. Embodiments of the present disclosure find application with laptop computers, tablet computers, smart phones, servers, media players, virtual reality head mounted displays, augmented reality display, hologram displays, and/or dedicated video conferencing equipment. The network 130 represents any number of networks that convey coded video data among the terminals 110-120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless explained hereinbelow.

FIG. 2 is a functional block diagram of a coding system 200 according to an embodiment of the present disclosure. The system 200 may include an image source 210, an image processing system 220, a video coder 230, a video decoder 240, a reference picture store 250 and a predictor 260. The image source 210 may generate image data as a multi-directional image, containing image data of a field of view that extends around a reference point in multiple directions. The image processing system 220 may convert the image data from a source representation to a "packed" representation, described herein, to increase efficiency of the video coder 230. The video coder 230 may generate a coded representation of its input image data, typically by exploiting spatial and/or temporal redundancies in the image data. The video coder 230 may output a coded representation of the input data that consumes less bandwidth than the original source video when transmitted and/or stored.

The video decoder 240 may invert coding operations performed by the video encoder 230 to obtain a reconstructed picture from the coded video data. Typically, the coding processes applied by the video coder 230 are lossy processes, which cause the reconstructed picture to possess various errors when compared to the original picture. The video decoder 240 may reconstruct picture of select coded pictures, which are designated as "reference pictures," and store the decoded reference pictures in the reference picture store 250. In the absence of transmission errors, the decoded reference pictures will replicate decoded reference pictures obtained by a decoder (not shown in FIG. 2).

The predictor 260 may select prediction references for new input pictures as they are coded. For each portion of the input picture being coded (called a "pixel block" for convenience), the predictor 260 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

When an appropriate prediction reference is identified, the predictor 260 may furnish the prediction data to the video coder 230. The video coder 230 may code input video data differentially with respect to prediction data furnished by the predictor 260. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 230 should consume less bandwidth than the input data when transmitted and/or stored. The coding system 200 may output the coded video data to an output device 270, such as a transmitter, that may transmit the coded video data across a communication network 130 (FIG. 1). Alternatively, the coding system 200 may output coded data to a storage device (not shown) such as an electronic-, magnetic- and/or optical storage medium.

FIG. 3 is a functional block diagram of a decoding system 300 according to an embodiment of the present disclosure. The decoding system 300 may include a receiver 310, a video decoder 320, an image processor 330, a video sink 340, a reference picture store 350 and a predictor 360. The receiver 310 may receive coded video data from a channel and route it to the video decoder 320. The video decoder 320 may decode the coded video data with reference to prediction data supplied by the predictor 360. The video decoder 320 may output decoded video data in a packed representation determined by an image processor 220 (FIG. 2) of a coding system that generated the coded video. The image processor 330 may generate output video data from the packed video in a representation that is appropriate for a video sink 340 that will consume the decoded video.

Packed video of reference frames may be stored in the reference picture store 350. The predictor may receive prediction metadata in the coded video data, retrieve content from the reference picture store 350 in response thereto, and provide the retrieved prediction content to the video decoder 320 for use in decoding.

The video sink 340, as indicated, may consume decoded video generated by the decoding system 300. Video sinks 340 may be embodied by, for example, display devices that render decoded video. In other applications, video sinks 340 may be embodied by computer applications, for example, gaming applications, virtual reality applications and/or video editing applications, that integrate the decoded video into their content. In some applications, a video sink may process the entire multi-directional field of view of the decoded video for its application but, in other applications, a video sink 340 may process a selected sub-set of content from the decoded video. For example, when rendering decoded video on a flat panel display, it may be sufficient to display only a selected sub-set of the multi-directional video. In another application, decoded video may be rendered in a multi-directional format, for example, in a planetarium.

FIG. 4 illustrates an exemplary omnidirectional camera 400 according to an embodiment of the present disclosure and image data that may be generated therefrom. As illustrated in FIG. 4(a), the camera 400 may contain a plurality of imaging systems 410, 420, 430 to capture image data in an omnidirectional field of view. Imaging systems 410 and 420 may capture image data in top and bottoms fields of view, respectively, as "flat" images. The imaging system 430 may capture image data in a 360° field of view about a horizon H established between the top and bottom fields of view. In the embodiment illustrated in FIG. 4, the imaging system 430 is shown as a panoramic camera composed of a pair of fish eye lenses 430.1, 430.2 and associated imaging devices (not shown), each arranged to capture image data in a hemispherical view of view. Images captured from the hemispherical fields of view may be stitched together to represent image data in a full 360° field of view.

FIG. 4(b) illustrates image data 450 that may be generated from the omnidirectional camera 400. The image 450 may contain regions 452, 454 for rectangular data from the top and bottom image sensors 410, 420 and a region 456 for equirectangular data from the panoramic camera 430. Image data captured by the top imaging system 410 may be flat image data that represents content from a planar projection 415 about the camera 400 in a first direction. The top image may be provided in a region 452 dedicated to the top field of view. Similarly, image data captured by the bottom imaging system 420 also may be flat image data that that content from a planar projection 425 about the camera 400 in a second direction; it may be provided in a region 454 dedicated to the bottom field of view. Image data from the panoramic imaging system 430 may not be flat image data. It may represent image content from a cylindrical projection 435 about the camera 400. The image data from the panoramic imaging system 430 may be placed in its own region 456 in image data.

As illustrated in FIG. 4(b), the regions 452, 454 and 456 may be packed into frame 450 having M×N pixels. Typically, it will be convenient to pack the regions 452, 454, 456 into a rectangular array to permit video coding for delivery to decoder-side terminals (not shown). In the example of FIG. 4(b), the regions 452, 454, 456 are shown being packed into a frame 450 whose width M corresponds to a width of the panoramic image content (region 456) and whose height N corresponds to an aggregate of the height N1 of the panoramic image content (region 456) and the height N2 of the top and bottom regions 452, 454. In many applications the top and bottom regions 452, 455 may (but need not) have common heights and widths. In cases where the top and bottom regions 452, 454 have differing heights, it is sufficient to define a height N of the frame 450 corresponding to a height of the panoramic region 456 and a tallest of the top and bottom regions 452, 454.

FIG. 4(b) illustrates one exemplary packing configuration for a frame 450 that is constructed from top, bottom and panoramic regions 452, 454, 456 but the principles of the present disclosure are not so limited. FIGS. 4(c) and 4(d) illustrate other permissible packing configurations for frame 460, 470 that may be developed from the top, bottom and panoramic regions 452, 454, 456. It is expected that, in practice, system designers will tailor packing configuration(s) to suit their individual needs.

In the example of FIG. 4, packed frames 450, 460, 470 may be created from camera systems that possess hardware to support capture of top image data, bottom image data and panoramic image data and placement of the captured data into corresponding regions 452, 454, 456 in the packed frames 450, 460, 470 without alteration. The principles of the present disclosure also support development of packed frames from other imaging systems, as described below.

Embodiments of the present disclosure permit use of top and bottom regions 452, 454 that are not square. For example, as illustrated in FIG. 4(d), the top and bottom regions 452, 456 may be circular.

Embodiments of the present disclosure also permit use of non-flat image content in the top and bottom regions 452, 454. For example, rather than employ flat image content, the image content of the top and/or bottom regions 452, 454 may represent content from curved projections about the camera 400 in respective directions.

Figure 5:
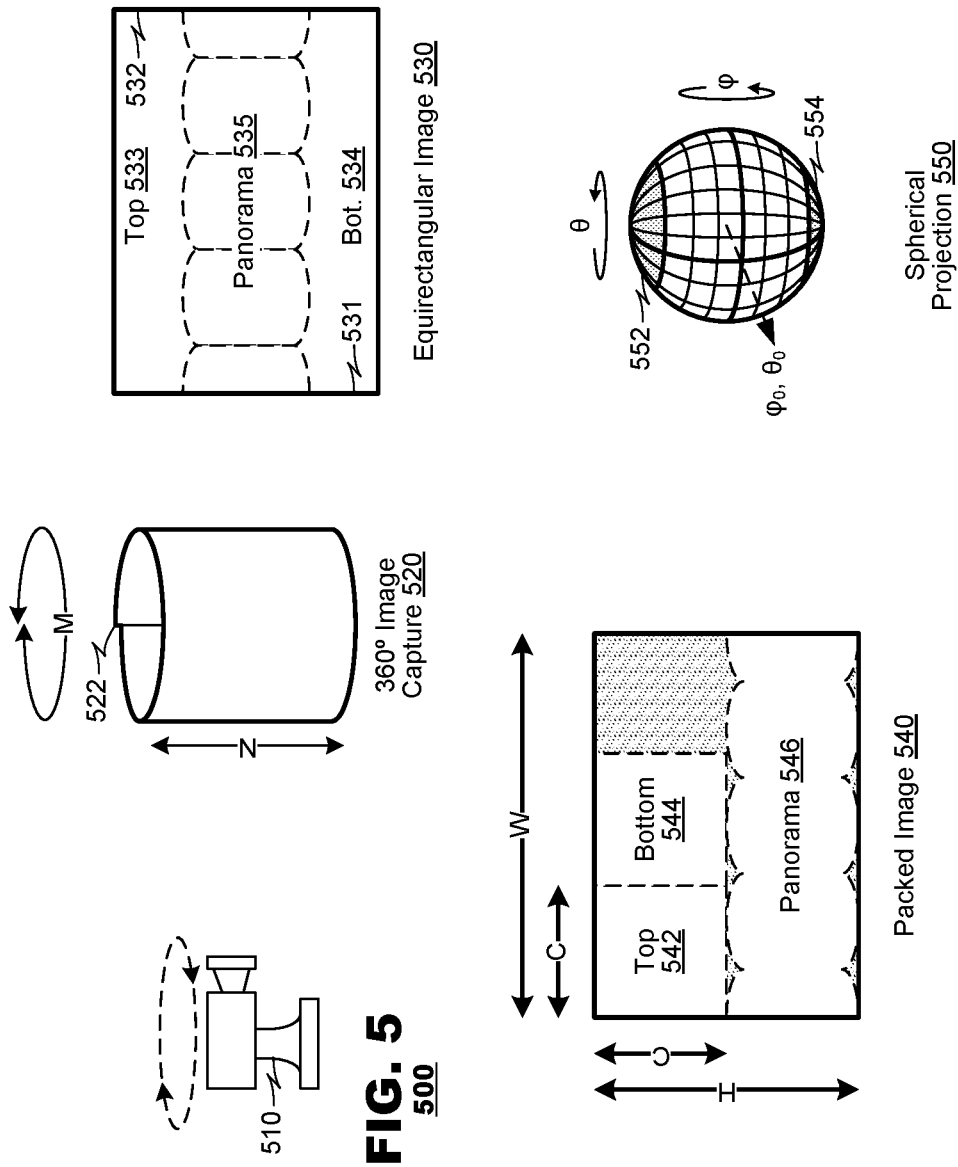
FIG. 5 illustrates image capture operations of an image source according to another embodiment of the present disclosure.

FIG. 5 illustrates an image source 510 that generates equirectangular image data. The image source 510 may be a camera that has a single image sensor (not shown) that pivots along an axis. During operation, the camera 510 may capture image content as it pivots along a predetermined angular distance 520 (preferably, a full 360°) and merge the captured image content into a 360° image. The capture operation may yield an equirectangular image 530 that may represent a multi-directional field of view 530 having been partitioned along a slice 522 that divides a cylindrical field of view into a two dimensional array of data. In the equirectangular picture 530, pixels on either edge 531, 532 of the image 530 represent adjacent image content even though they appear on different edges of the equirectangular picture 530. Top and bottom image content of the equirectangular picture 530 may occupy regions 533, 534 on opposing sides of a region 535 that contains panoramic image content.

In an embodiment, a packed image 540 may be created from an equirectangular image by performing a transform of content in top and bottom image regions 533, 534 to generate flat image representations 542, 544 which may be placed in the packed frame 540. Panoramic image content 535 may be placed in the packed frame 540 without alteration.

In an embodiment, the equirectangular image 530 may be transformed to a spherical projection. An image processor 220 (FIG. 2) may transform pixel data at locations (x,y) within the equirectangular picture 530 to locations (θ, φ) along a spherical projection 550 according to a transform such as:

$$\theta = \alpha \cdot x + \theta_0, \text{ and} \quad (\text{Eq. 1.})$$

$$\varphi = \beta \cdot y + \varphi_0, \text{ where} \quad (\text{Eq. 2.})$$

θ and φ respectively represents the longitude and latitude of a location in the spherical projection 530, where α, β are scalars, $\theta_0$, $\varphi_0$ represent an origin of the spherical projection 550, and x and y represent the horizontal and vertical coordinates of source data in top and bottom image regions 533, 534 of the equirectangular picture 530.

When applying the transform, the image processor 220 (FIG. 2) may transform each pixel location along a predetermined row of the equirectangular picture 520 to have a unique location at an equatorial latitude in the spherical projection 550. In such regions, each location in the spherical projection 550 may be assigned pixel values from corresponding locations of the equirectangular picture 530. At locations toward poles of the spherical projection 530, top and bottom image regions 533, 534, the image processor 220 (FIG. 2) may map several source locations from the equirectangular picture 530 to a common location in the spherical projection 550. In such a case, the image processor 220 (FIG. 2) may derive pixel values for the locations in the spherical projection 550 from a blending of corresponding pixel values in the equirectangular picture 530 (for example, by averaging pixel values at corresponding locations of the equirectangular picture 530).

The image processor 220 (FIG. 2) may perform a transform of image data in the spherical projection 550 to flat image data for the top and bottom regions 542, 544 through counter-part transform techniques. Image data for the top region 542 may be derived from spherical projection data corresponding to a first pole 552 of the spherical projection 550. Similarly, image data for the bottom region 544 may be derived from spherical projection data corresponding to a second pole 554 of the spherical projection. Specifically, pixel locations (θ,φ) in the spherical projection may map to locations (x,y,z) in a three-dimensional Cartesian space as follows:

$$x = r^* \sin(\varphi)^* \cos(\theta), \quad (\text{Eq. 3})$$

$$y = r^* \sin(\varphi)^* \sin(\theta) \quad (\text{Eq. 4})$$

$$z = r^* \cos(\varphi), \text{ where} \quad (\text{Eq. 5})$$

r represents a radial distance of the point φ from a center of the polar region 552.

For the top and bottom regions 542, 544, pixel locations (p,q) representing horizontal and vertical location the regions can be derived as, for the top region 542:

$$p = y + w_p, \text{ and} \quad (\text{Eq. 6.})$$

$$q = x + w_q, \text{ where} \quad (\text{Eq. 7.})$$

$w_p$ and $w_q$ represent respective horizontal and vertical offsets for a center point of in the region 542.

And, for the bottom region 544, pixel locations (p,q) in the region may be derived as:

$$p = y + w_p'\quad\text{(Eq. 8.)}$$

$$q = w_q' - x, \text{ where}\quad\text{(Eq. 9.)}$$

$w_p'$ and $w_q'$ represent respective horizontal and vertical offsets for a center point of in the region 544.

Figure 6:
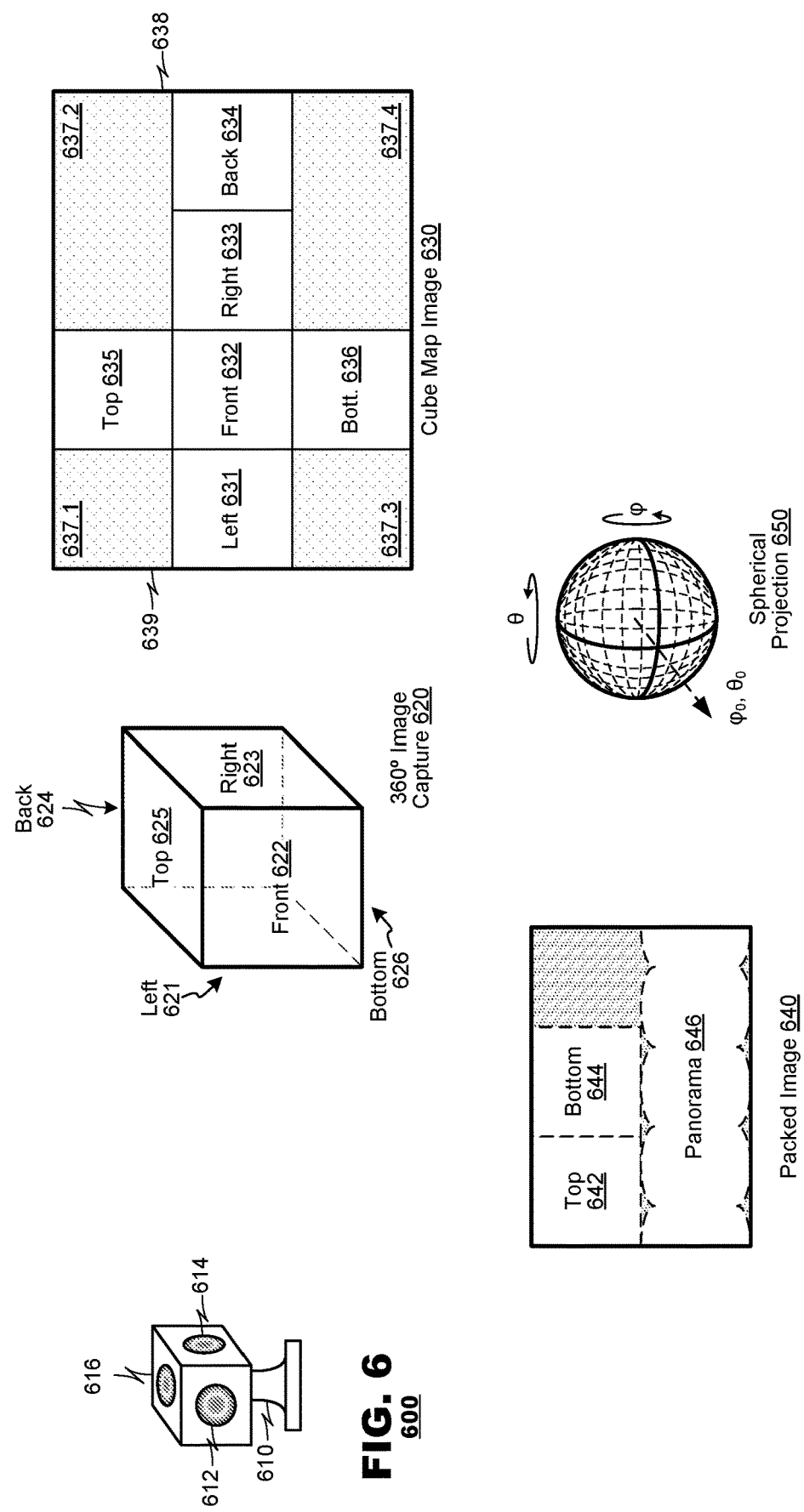
FIG. 6 illustrates image capture operations of an image source according to a further embodiment of the present disclosure.

FIG. 6 illustrates image capture operations of another type of image source, an omnidirectional camera 610. In this embodiment, a camera system 610 may perform a multi-directional capture operation and output a cube map picture 630 in which image content is arranged according to a cube map capture 620. The image capture 620 may capture image data in each of a predetermined number of directions 621-626 (typically, six) which are stitched together according to a cube map layout 630. In the example illustrated in FIG. 6, six sub-images corresponding to a left view 631, a front view 632, a right view 633, a back view 631, a top view 635 and a bottom view 636 may be captured, stitched and arranged within the multi-directional picture 630 according to "seams" of image content between the respective views. Thus, as illustrated in FIG. 6, pixels from the front image 632 that are adjacent to the pixels from each of the left, the right, the top, and the bottom images 631, 633, 635, 636 represent image content that is adjacent respectively to content of the adjoining sub-images. Similarly, pixels from the right and back images 633, 634 that are adjacent to each other represent adjacent image content. Further, content from a terminal edge 638 of the back image 634 is adjacent to content from an opposing terminal edge 639 of the left image. The cube map picture 630 also may have regions 637.1-637.4 that do not belong to any image.

According to an embodiment, a packed image 640 may be derived from the cube map image 630. Top and bottom regions 642, 644 may be generated directly from corresponding sub-images 635, 636 of the cube map image 630. A region 646 of panoramic data may be created by an image processor 220 (FIG. 2) according to a spherical projection 650 of corresponding sub-images 631-634 from the cube map image 630. The image processor 220 (FIG. 2) may transform pixel data at locations (x,y) within the cube map picture 630 to locations (θ, φ) along a spherical projection 650 according to transforms derived from each sub-image in the cube map. Each sub-image 621-626 of the image capture 620 corresponds to a predetermined angular region of a surface of the spherical projection 650. Thus, image data 632 of the front face 622 may be projected to a predetermined portion on the surface of the spherical projection 650, and image data of the left, right, back, top and bottom sub-images 631, 633-636 may be projected on corresponding portions of the surface of the spherical projection 650.

In a cube map having square sub-images, where the height and width of the sub-images 631-636 typically are equal, each sub-image projects to a 90°×90° region of the projection 650 surface. Thus, each position x,y with a sub-image 631, 632, 633, 634, 635, and 636 maps to a θ, φ location on the spherical projection 650 based on a sinusoidal projection function of the form $y = f^k(x, y)$ and $\theta = g^k(x, y)$, where x,y represent displacements from a center of the cube face k for top, bottom, front, right, left, right and θ, φ represent angular deviations in the sphere.

When applying the transform, some pixel locations in the cube map picture 630 may map to a unique location in the spherical projection 650. In such regions, each location in the spherical projection 650 may be assigned pixel values from corresponding locations of the cube map picture 630. At other locations, particularly toward edges of the respective sub-images, the image processor 220 (FIG. 2) may map image data from several source locations in the cube map picture 630 to a common location in the spherical projection 650. In such a case, the image processor 220 (FIG. 2) may derive pixel values for the locations in the spherical projection 650 from a blending of corresponding pixel values in the cube map picture 630 (for example, by a weighted averaging pixel values at corresponding locations of cube map picture 630).

Figure 7:
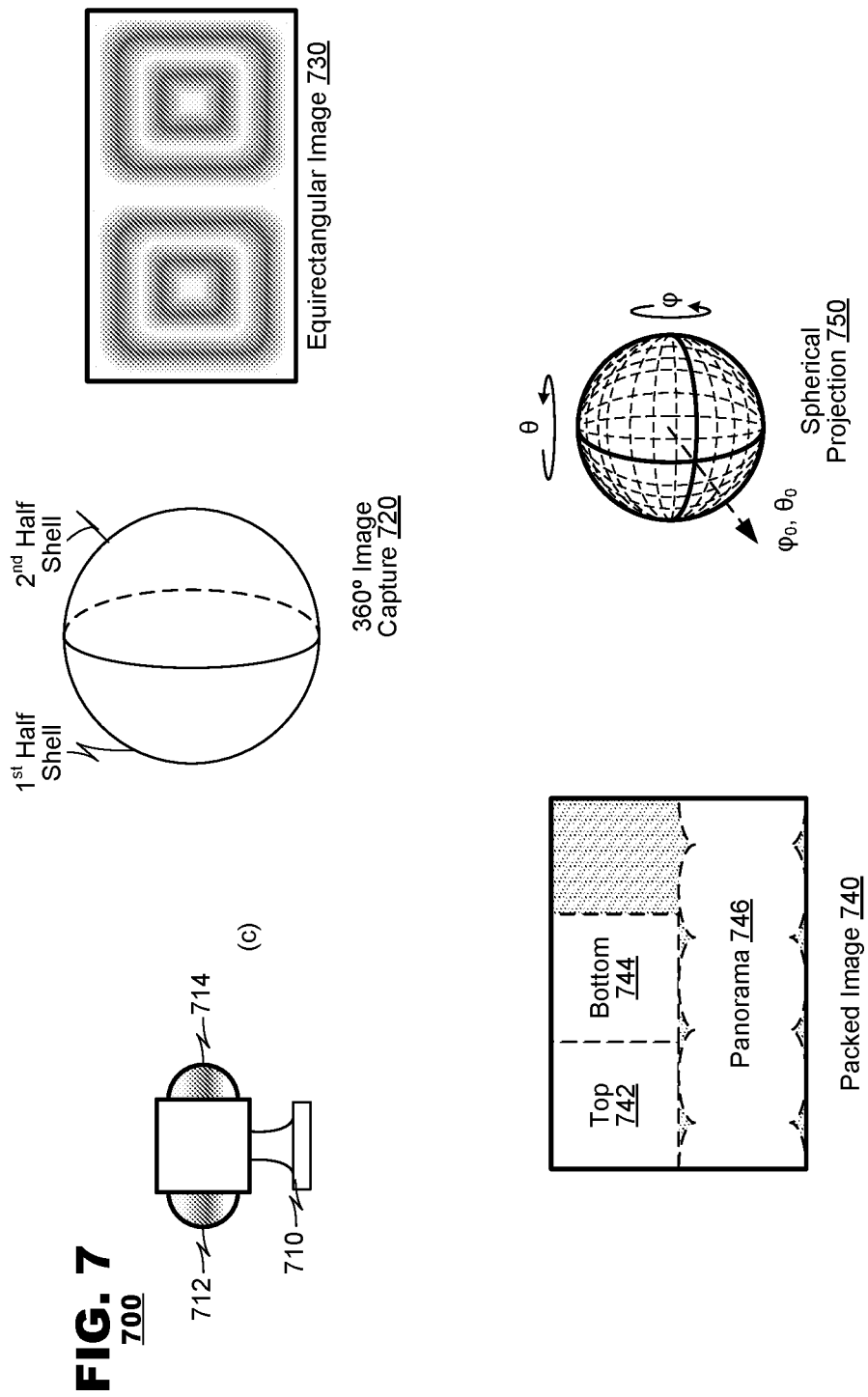
FIG. 7 illustrates image capture operations of an image source according to another embodiment of the present disclosure.

FIG. 7 illustrates image capture operations of another type of image source, a camera 710 having a pair of fish-eye lenses 712, 712. In this embodiment, each lens system 712, 714 captures data in a different 180° field of view, representing opposed "half shells." The camera 710 may generate an equirectangular image 730 from a stitching of images generated from each lens system 712, 714. Fish eye lenses typically induce distortion based on object location within each half shell field of view. In an embodiment, a packed frame 740 may be generated from the multi-directional image 730 via a spherical projection 750. That is, image data of the half shells in the equirectangular image may be transformed to a spherical projection and image data of the spherical projection 750 may be transformed to the packed image 740. Creation of the packed image 740 from the spherical projection 750 may occur as described in connection with FIG. 5.

The techniques of the present disclosure find application with other types of image capture and projection techniques. For example, segmented sphere, truncated pyramid-, tetra-hedral-, octahedral-, dodecahedral- and icosahedral-based image capture techniques may be employed. Images obtained therefrom may be mapped to a spherical projection through analogous techniques.

Image sources need not include cameras. In other embodiments, an image source 210 (FIG. 2) may be a computer application that generates 360° image data. For example, a gaming application may model a virtual world in three dimensions and generate a spherical image based on synthetic content. And, of course, a spherical image may contain both natural content (content generated from a camera) and synthetic content (computer graphics content) that has been merged together by a computer application.

The packed frames of the foregoing embodiments share characteristics with both cube map and equirectangular images. As illustrated in FIG. 6, the top and bottom regions 642, 644 of a packed image 640 resemble their top and bottom counterparts 635, 636 from a cube map image 630. No transformation is required to generate the top and bottom regions 642, 644 from their cube map counterparts 635, 636. Similarly, as illustrated in FIG. 5, the panoramic region 546 of a packed image resembles its counterpart 535 from an equirectangular image 530. No transformation is required to generate the panoramic region 546 from its equirectangular counterpart 535. In this regard, the packed images 450, 460, 470, 540, 640, and 740 of the foregoing embodiments may be considered as hybrid frames—they blend image regions 642, 646 from cube map representations 640 (FIG. 6) and panoramic image regions 546 of equirectangular representations 540 (FIG. 5) of omnidirectional images. It is expected that use of such hybrid representations may lead to efficiencies during coding.

FIG. 8 figuratively illustrates the types of coding efficiencies that are expected to be realized from use of hybrid frames such as those described in the foregoing embodiments. FIG. 8 illustrates examples in which a pair of objects Obj1, Obj2 are to be coded via representation in in a hybrid frame 810, in an equirectangular frame 820 and in a cube map frame 830. In this example, the first object Obj1 exhibits movement from time t1 to time t2 within a top region of each frame. The second object Obj2 exhibits movement from time t1 to time t2 that causes it to move laterally within panoramic image content.

Because the top region 822 of the equirectangular image 820 occupies the entire width of the equirectangular image 820, movement of the first object Obj1 may cause much larger displacement d2 of image content as compared to the same movement in the packed frame representation 810, shown as displacement d1. Moreover, the displacement also may cause spatial distortion of the object in the equirectangular representation 820, which may cause the object's image content to be "stretched" at time t2 as compared to its representation at time t1 and also may cause the object's content to be rotated within the equirectangular representation 820. Due to such distortions, it is possible that a video coder 230 will fail to recognize that the object's representation at time t1 may be used as a prediction reference for the same object's representation at time t2. As a result, a video coder may not code the object's image data as efficiently as otherwise possible.

Distortions that arise in a purely equirectangular representation 820 of image data are not expected to occur in the hybrid representation 810 of the foregoing embodiments. As shown in the hybrid representation, object movement that is confined to a top region 812 likely will not incur large displacements or the kinds of spatial and rotation distortions that occur in the equirectangular representation 820. Accordingly, it is expected that a video coder 230 will better recognize prediction references when coding image data in the hybrid representation.

FIG. 8 also illustrates exemplary movement of a second object Obj2 within a panoramic region 816 of the hybrid representation 810. In this example, the second object Obj2 may exhibit movement that, in a cube map representation 830 would cause the object to move from one sub-image (here, the front image 832) to a second sub-image, the left image 831. In the hybrid representation, such object movements will tend to exhibit relatively small displacements and image distortion that corresponds to the object's location within the panoramic image.

In the cube map representation 830, when object displacement moves objects across sub-images, such displacement often causes rotational displacements. In the example illustrated in FIG. 8, object movement from a front sub-image 832 to a left sub-image 831 may cause the object to rotate its orientation as is transitions across the sub-images. Due to such rotations, it is possible that a video coder 230 will fail to recognize that the object's representation at time t1 may be used as a prediction reference for the same object's representation at time t2. Here again, a video coder may not code the object's image data as efficiently as otherwise possible.

Moreover, in a cube map representation, object movement can introduce distortions at seams between sub-images 831, 832. Taking object Obj2 for example, as the object moves from the front sub-image 832 to the left sub-image 831, the object's image content likely will be distorted as the object crosses the seam between the sub-images 832, 831. In the format of frame 810, the object's representation in the panorama region 816 may provide a representation of the object in a spherical projection which may limit object distortions.

Such distortions are expected to be less pronounced when they occur in panoramic regions 816 of a hybrid image 810. Accordingly, it is expected that a video coder 230 will better recognize prediction references when coding image data in the hybrid representation.

FIG. 9 illustrates a prediction technique according to an embodiment of the present disclosure. In this embodiment, a prediction system may develop content padding around the different views 911-916 of a multi-directional input picture in order to code the input picture by motion-compensation predictive coding. FIG. 9(a) illustrates an exemplary multi-directional input picture 900 that may be coded predictively. The picture 900 as it is input to a video coder 230 (FIG. 2) may contain views 911-916. According to the embodiment, as shown in FIG. 9(b), each view 922 may be extracted from the image 910 and have padding content 924 provided about a periphery of the view 922 to form a padded image 920. Thus, if a view 922 from the image 910 has a dimension of C×C pixels, a padded image 920 of size C+2p×C+2p may be created for coding purposes. An exemplary padded input picture 930 is illustrated in FIG. 9(c) working from the exemplary format of FIG. 9(a). The padded input picture 930 may be processed by the video coder 230 to code the input picture and, after transmission to another device, it may be processed by a video decoder 320 to recover the padded input picture 930.

The padded image content 924 may be derived from spherical projections of views that are adjacent to each source view from the input picture 910. For example, in the image 630 illustrated in FIG. 6, the front view 632 is bordered by the left view 631, the right view 633, the top view 635 and the bottom view 636. Image content from these views 631, 633, 635, and 636 that is adjacent to the front view 632 may be used as padding content in the prediction operations illustrated in FIG. 9. In an embodiment, the padding content may be generated by projecting image data from the adjacent views 631, 633, 635, and 636 to a spherical projection (FIG. 6) and projecting the image data from the spherical projection to the plane of the view 632 for which the padding data is being created.

Similarly, padding data may be generated for input pictures having a format 1010 such as illustrated in FIG. 10. Source pictures may be in a projection format having a top view 1012, a bottom view 1014 and a panoramic view 1016. Padding data 1024 may be placed adjacent to each of the top and bottom views 1022 (FIG. 10(b)), which may be derived from panoramic content by a spherical projection (FIG. 5). Moreover, padding data 1034, 1036 may be placed adjacent to the panoramic content 1032 (FIG. 10(c)), which may be derived from the top and bottom views 1012, 1014 also by spherical projection (FIG. 6). Thus, a padded image 1040 (FIG. 10(d)) may be formed from an aggregation of the source content of the picture 1010 and the padded content 1024, 1032 1036.

Embodiments of the present disclosure provide coding systems that generate padded images from input pictures and perform video coding/decoding operations on the basis of the padded images. Thus, a padded input image may be partitioned into a plurality of pixel blocks and coded on a pixel-block-by-pixel-block basis.

Figure 11:
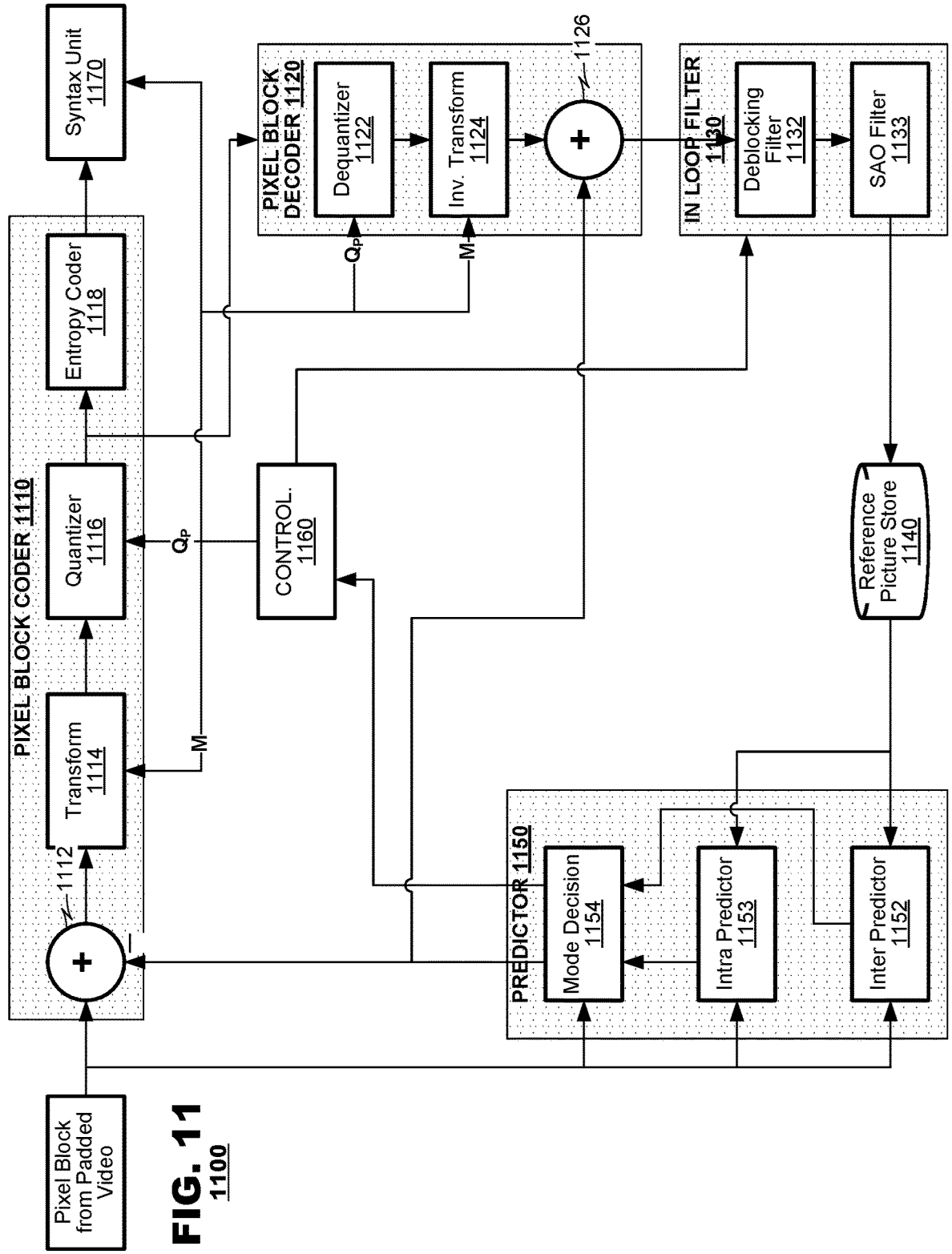
FIG. 11 is a functional block diagram of a coding system according to an embodiment of the present disclosure.

FIG. 11 is a functional block diagram of a coding system 1100 according to an embodiment of the present disclosure. The system 1100 may include a pixel block coder 1110, a pixel block decoder 1120, an in-loop filter system 1130, a reference picture store 1140, a predictor 1150, a controller 1160, and a syntax unit 1170. The pixel block coder and decoder 1110, 1120 and the predictor 1150 may operate iteratively on individual pixel blocks of a picture that has been padded according to one of the foregoing embodiments. The predictor 1150 may predict data for use during coding of a newly-presented input pixel block. The pixel block coder 1110 may code the new pixel block by predictive coding techniques and present coded pixel block data to the syntax unit 1170. The pixel block decoder 1120 may decode the coded pixel block data, generating decoded pixel block data therefrom. The in-loop filter 1130 may perform various filtering operations on a decoded picture that is assembled from the decoded pixel blocks obtained by the pixel block decoder 1120. The filtered picture may be stored in the reference picture store 1140 where it may be used as a source of prediction of a later-received pixel block. The syntax unit 1170 may assemble a data stream from the coded pixel block data which conforms to a governing coding protocol.

The pixel block coder 1110 may include a subtractor 1112, a transform unit 1114, a quantizer 1116, and an entropy coder 1118. The pixel block coder 1110 may accept pixel blocks of input data at the subtractor 1112. The subtractor 1112 may receive predicted pixel blocks from the predictor 1150 and generate an array of pixel residuals therefrom representing a difference between the input pixel block and the predicted pixel block. The transform unit 1114 may apply a transform to the sample data output from the subtractor 1112, to convert data from the pixel domain to a domain of transform coefficients. The quantizer 1116 may perform quantization of transform coefficients output by the transform unit 1114. The quantizer 1116 may be a uniform or a non-uniform quantizer. The entropy coder 1118 may reduce bandwidth of the output of the coefficient quantizer by coding the output, for example, by variable length code words.

The transform unit 1114 may operate in a variety of transform modes as determined by the controller 1160. For example, the transform unit 1114 may apply a discrete cosine transform (DCT), a discrete sine transform (DST), a Walsh-Hadamard transform, a Haar transform, a Daubechies wavelet transform, or the like. In an embodiment, the controller 1160 may select a coding mode M to be applied by the transform unit 1115, may configure the transform unit 1115 accordingly and may signal the coding mode M in the coded video data, either expressly or impliedly.

The quantizer 1116 may operate according to a quantization parameter $Q_P$ that is supplied by the controller 1160. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 1118, as its name implies, may perform entropy coding of data output from the quantizer 1116. For example, the entropy coder 1118 may perform run length coding, Huffman coding, Golomb coding and the like.

The pixel block decoder 1120 may invert coding operations of the pixel block coder 1110. For example, the pixel block decoder 1120 may include a dequantizer 1122, an inverse transform unit 1124, and an adder 1126. The pixel block decoder 1120 may take its input data from an output of the quantizer 1116. Although permissible, the pixel block decoder 1120 need not perform entropy decoding of entropy-coded data since entropy coding is a lossless event. The dequantizer 1122 may invert operations of the quantizer 1116 of the pixel block coder 1110. The dequantizer 1122 may perform uniform or non-uniform de-quantization as specified by the decoded signal $Q_P$. Similarly, the inverse transform unit 1124 may invert operations of the transform unit 1114. The dequantizer 1122 and the inverse transform unit 1124 may use the same quantization parameters $Q_P$ and transform mode M as their counterparts in the pixel block coder 1110. Quantization operations likely will truncate data in various respects and, therefore, data recovered by the dequantizer 1122 likely will possess coding errors when compared to the data presented to the quantizer 1116 in the pixel block coder 1110.

The adder 1126 may invert operations performed by the subtractor 1112. It may receive the same prediction pixel block from the predictor 1150 that the subtractor 1112 used in generating residual signals. The adder 1126 may add the prediction pixel block to reconstructed residual values output by the inverse transform unit 1124 and may output reconstructed pixel block data.

The in-loop filter 1130 may perform various filtering operations on recovered pixel block data. For example, the in-loop filter 1130 may include a deblocking filter 1132 and a sample adaptive offset ("SAO") filter 1133. The deblocking filter 1132 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 1130 may operate according to parameters that are selected by the controller 1160.

The reference picture store 1140 may store filtered pixel data for use in later prediction of other pixel blocks. Different types of prediction data are made available to the predictor 1150 for different prediction modes. For example, for an input pixel block, intra prediction takes a prediction reference from decoded data of the same picture in which the input pixel block is located. Thus, the reference picture store 1140 may store decoded pixel block data of each picture as it is coded. For the same input pixel block, inter prediction may take a prediction reference from previously coded and decoded picture(s) that are designated as reference pictures. Thus, the reference picture store 1140 may store these decoded reference pictures.

As discussed, the predictor 1150 may supply prediction data to the pixel block coder 1110 for use in generating residuals. The predictor 1150 may include an inter predictor 1152, an intra predictor 1153 and a mode decision unit 1152. The inter predictor 1152 may receive pixel block data representing a new pixel block to be coded and may search reference picture data from store 1140 for pixel block data from reference picture(s) for use in coding the input pixel block. The inter predictor 1152 may support a plurality of prediction modes, such as P mode coding and B mode coding. The inter predictor 1152 may select an inter prediction mode and an identification of candidate prediction reference data that provides a closest match to the input pixel block being coded. The inter predictor 1152 may generate prediction reference metadata, such as motion vectors, to identify which portion(s) of which reference pictures were selected as source(s) of prediction for the input pixel block.

The intra predictor 1153 may support Intra (I) mode coding. The intra predictor 1153 may search from among pixel block data from the same picture as the pixel block being coded that provides a closest match to the input pixel block. The intra predictor 1153 also may generate prediction reference indicators to identify which portion of the picture was selected as a source of prediction for the input pixel block.

The mode decision unit 1152 may select a final coding mode to be applied to the input pixel block. Typically, as described above, the mode decision unit 1152 selects the prediction mode that will achieve the lowest distortion when video is decoded given a target bitrate. Exceptions may arise when coding modes are selected to satisfy other policies to which the coding system 1100 adheres, such as satisfying a particular channel behavior, or supporting random access or data refresh policies. When the mode decision selects the final coding mode, the mode decision unit 1152 may output a selected reference block from the store 1140 to the pixel block coder and decoder 1110, 1120 and may supply to the controller 1160 an identification of the selected prediction mode along with the prediction reference indicators corresponding to the selected mode.

The controller 1160 may control overall operation of the coding system 1100. The controller 1160 may select operational parameters for the pixel block coder 1110 and the predictor 1150 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 1170, which may include data representing those parameters in the data stream of coded video data output by the system 1100. The controller 1160 also may select between different modes of operation by which the system may generate reference images and may include metadata identifying the modes selected for each portion of coded data.

During operation, the controller 1160 may revise operational parameters of the quantizer 1116 and the transform unit 1115 at different granularities of image data, either on a per pixel block basis or on a larger granularity (for example, per picture, per slice, per largest coding unit ("LCU") or another region). In an embodiment, the quantization parameters may be revised on a per-pixel basis within a coded picture.

Additionally, as discussed, the controller 1160 may control operation of the in-loop filter 1130 and the prediction unit 1150. Such control may include, for the prediction unit 1150, mode selection (lambda, modes to be tested, search windows, distortion strategies, etc.), and, for the in-loop filter 1130, selection of filter parameters, reordering parameters, weighted prediction, etc.

The principles of the present discussion may be used cooperatively with other coding operations that have been proposed for multi-directional video. For example, the predictor 1150 may perform prediction searches using input pixel block data and reference pixel block data in a spherical projection. Operation of such prediction techniques are may be performed as described in U.S. patent application Ser. No. 15/390,202, filed Dec. 23, 2016 and U.S. patent application Ser. No. 15/443,342, filed Feb. 27, 2017, both of which are assigned to the assignee of the present application, the disclosures of which are incorporated herein by reference.

In the embodiment of FIG. 11, the coding system 1100 may operate on pixel blocks taken from a padded input picture. The padded input picture may be partitioned into the pixel blocks according to conventional processes, for example, as described in a governing coding protocol, such as HEVC, AVC and the like. It is expected that partitioning processes will not align pixel blocks with boundaries between views of a multi-directional image (FIGS. 4-8) or with boundaries between views of a multi-directional image and null regions of the image. Use of padded image content in input images is expected to increase the likelihood that prediction search techniques will identify prediction matches for inter- and/or intra-coding purposes as compared to prediction search techniques that do not operate on padded image content.

Moreover, it is expected that use of padding information may cause contours from the different views of the source image to align better with coding blocks from reference pictures. This is another basis on which it is expected that use of padding data may improve operation of predictive search operations.

Figure 12:
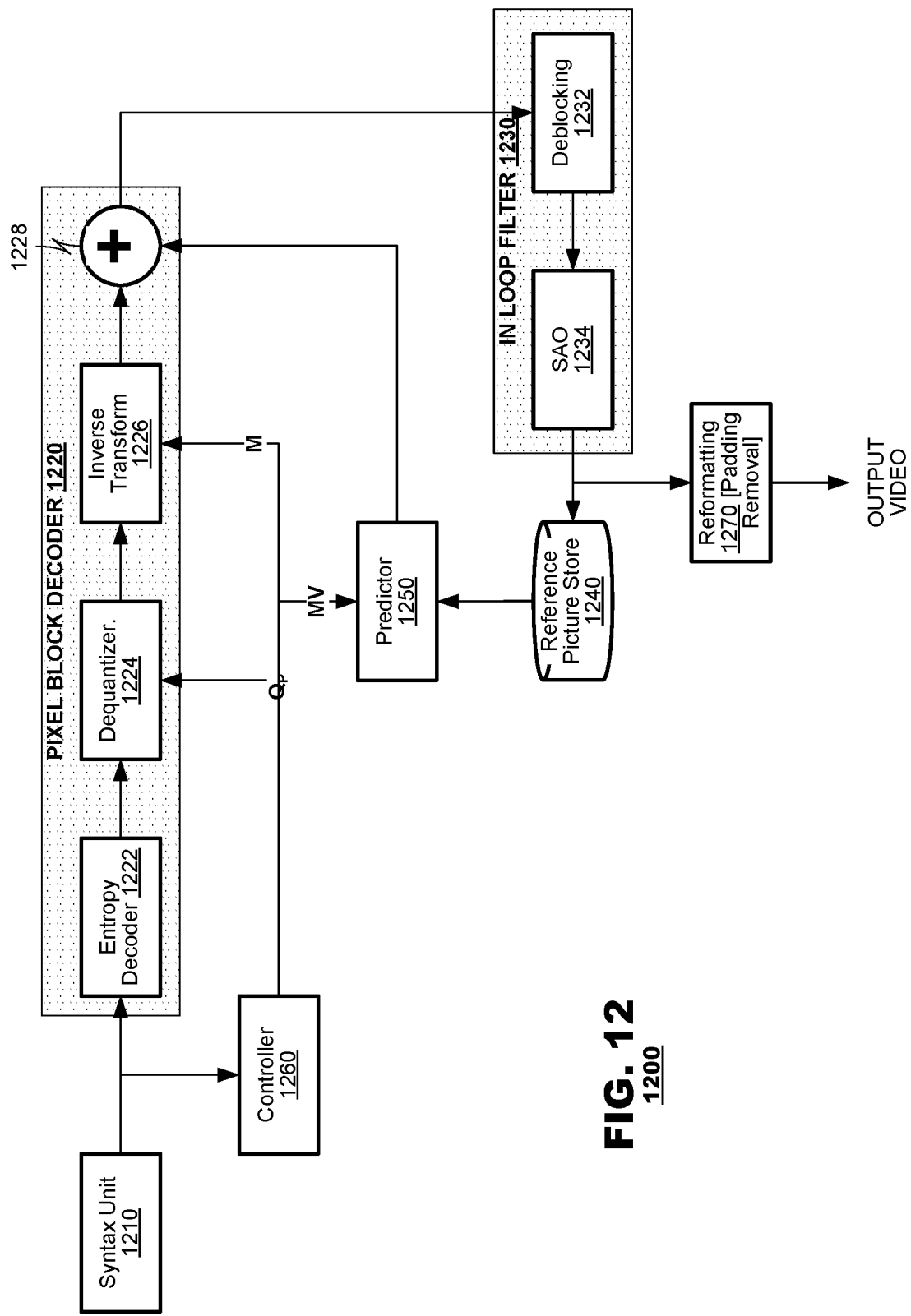
FIG. 12 is a functional block diagram of a decoding system according to an embodiment of the present disclosure.

FIG. 12 is a functional block diagram of a decoding system 1200 according to an embodiment of the present disclosure. The decoding system 1200 may include a syntax unit 1210, a pixel block decoder 1220, an in-loop filter 1230, a reference picture store 1240, a predictor 1250, a controller 1260 and a reformatting unit 1270. The syntax unit 1210 may receive a coded video data stream and may parse the coded data into its constituent parts. Data representing coding parameters may be furnished to the controller 1260 while data representing coded residuals (the data output by the pixel block coder 1110 of FIG. 11) may be furnished to the pixel block decoder 1220. The pixel block decoder 1220 may invert coding operations provided by the pixel block coder 1110 (FIG. 11). The in-loop filter 1230 may filter reconstructed pixel block data. The reconstructed pixel block data may be assembled into pictures for display and output from the decoding system 1200 as output video. The pictures also may be stored in the prediction buffer 1240 for use in prediction operations. The predictor 1250 may supply prediction data to the pixel block decoder 1220 as determined by coding data received in the coded video data stream. The reformatting unit 1270 may remove padding content from a decoded image.

The pixel block decoder 1220 may include an entropy decoder 1222, a dequantizer 1224, an inverse transform unit 1226, and an adder 1228. The entropy decoder 1222 may perform entropy decoding to invert processes performed by the entropy coder 1118 (FIG. 11). The dequantizer 1224 may invert operations of the quantizer 1216 of the pixel block coder 1110 (FIG. 11). Similarly, the inverse transform unit 1226 may invert operations of the transform unit 1114 (FIG. 11). They may use the quantization parameters $Q_P$ and transform modes M that are provided in the coded video data stream. Because quantization is likely to truncate data, the data recovered by the dequantizer 1224, likely will possess coding errors when compared to the input data presented to its counterpart quantizer 1216 in the pixel block coder 1110 (FIG. 11).

The adder 1228 may invert operations performed by the subtractor 1112 (FIG. 11). It may receive a prediction pixel block from the predictor 1250 as determined by prediction references in the coded video data stream. The adder 1228 may add the prediction pixel block to reconstructed residual values output by the inverse transform unit 1226 and may output reconstructed pixel block data.

The in-loop filter 1230 may perform various filtering operations on reconstructed pixel block data. As illustrated, the in-loop filter 1230 may include a deblocking filter 1232 and an SAO filter 1234. The deblocking filter 1232 may filter data at seams between reconstructed pixel blocks to reduce discontinuities between the pixel blocks that arise due to coding. SAO filters 1234 may add offset to pixel values according to an SAO type, for example, based on edge direction/shape and/or pixel level. Other types of in-loop filters may also be used in a similar manner. Operation of the deblocking filter 1232 and the SAO filter 1234 ideally would mimic operation of their counterparts in the coding system 1100 (FIG. 11). Thus, in the absence of transmission errors or other abnormalities, the decoded picture obtained from the in-loop filter 1230 of the decoding system 1200 would be the same as the decoded picture obtained from the in-loop filter 1110 of the coding system 1100 (FIG. 11); in this manner, the coding system 1100 and the decoding system 1200 should store a common set of reference pictures in their respective reference picture stores 1140, 1240.

The reference picture store 1240 may store filtered pixel data for use in later prediction of other pixel blocks. The reference picture store 1240 may store decoded pixel block data of each picture as it is coded for use in intra prediction. The reference picture store 1240 also may store decoded reference pictures.

As discussed, the predictor 1250 may supply the transformed reference block data to the pixel block decoder 1220. The predictor 1250 may supply predicted pixel block data as determined by the prediction reference indicators supplied in the coded video data stream.

The controller 1260 may control overall operation of the coding system 1200. The controller 1260 may set operational parameters for the pixel block decoder 1220 and the predictor 1250 based on parameters received in the coded video data stream. As is relevant to the present discussion, these operational parameters may include quantization parameters $Q_P$ for the dequantizer 1224 and transform modes M for the inverse transform unit 1210. As discussed, the received parameters may be set at various granularities of image data, for example, on a per pixel block basis, a per picture basis, a per slice basis, a per LCU basis, or based on other types of regions defined for the input image.

And, further, the controller 1260 may perform transforms of reference pictures stored in the reference picture store 1240 when new packing configurations are detected in coded video data.

In an embodiment, a reformatting unit 1270 may remove padding content from decoded images output by the in loop filter 1230. The reformatting unit 1270 may extract view data from decoded images and constructed reformatted images having a format that matches a source format of the input images. For example, with reference to FIG. 9, the reformatting unit 1270 may extract data of the different views 931-936 (FIG. 9(*c*)) from a padded decoded image to construct an output image having the form of FIG. 9(*a*). Similarly, with reference to FIG. 10, the reformatting unit 1270 may extract data of the different views 1042, 1044, 1046 (FIG. 10(*c*)) from a padded decoded image to construct an output image having the format of FIG. 10(*a*).

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

For example, the techniques described herein may be performed by a central processor of a computer system. FIG. 13 illustrates an exemplary computer system 1300 that may perform such techniques. The computer system 1300 may include a central processor 1310, one or more cameras 1320, a memory 1330, and a transceiver 1340 provided in communication with one another. The camera 1320 may perform image capture and may store captured image data in the memory 1330. Optionally, the device also may include sink components, such as a coder 1350 and a display 1340, as desired.

The central processor 1310 may read and execute various program instructions stored in the memory 1330 that define an operating system 1312 of the system 1300 and various applications 1314.1-1314.N. The program instructions may perform coding mode control according to the techniques described herein. As it executes those program instructions, the central processor 1310 may read, from the memory 1330, image data created either by the camera 1320 or the applications 1314.1-1314.N, which may be coded for transmission. The central processor 1310 may execute a program that operates according to the principles of FIG. 6. Alternatively, the system 1300 may have a dedicated coder 1350 provided as a standalone processing system and/or integrated circuit.

As indicated, the memory 1330 may store program instructions that, when executed, cause the processor to perform the techniques described hereinabove. The memory 1330 may store the program instructions on electrical-, magnetic- and/or optically-based storage media.

The transceiver 1340 may represent a communication system to transmit transmission units and receive acknowledgement messages from a network (not shown). In an embodiment where the central processor 1310 operates a software-based video coder, the transceiver 1340 may place data representing state of acknowledgment message in memory 1330 to retrieval by the processor 1310. In an embodiment where the system 1300 has a dedicated coder, the transceiver 1340 may exchange state information with the coder 1350.

The foregoing discussion has described the principles of the present disclosure in terms of encoding systems and decoding systems. As described, an encoding system typically codes video data for delivery to a decoding system where the video data is decoded and consumed. As such, the encoding system and decoding system support coding, delivery and decoding of video data in a single direction. In applications where bidirectional exchange is desired, a pair of terminals 110, 120 (FIG. 1) each may possess both an encoding system and a decoding system. An encoding system at a first terminal 110 may support coding of video data in a first direction, where the coded video data is delivered to a decoding system at the second terminal 120. Moreover, an encoding system also may reside at the second terminal 120, which may code of video data in a second direction, where the coded video data is delivered to a decoding system at the second terminal 110. The principles of the present disclosure may find application in a single direction of a bidirectional video exchange or both directions as may be desired by system operators. In the case where these principles are applied in both directions, then the operations described herein may be performed independently for each directional exchange of video.

Several embodiments of the present disclosure are specifically illustrated and described herein. However, it will be appreciated that modifications and variations of the present disclosure are covered by the above teachings and within the purview of the appended claims without departing from the spirit and intended scope of the invention.

We claim:

1. A method of processing multi-directional image data, comprising:
   decoding coded video data representing the multi-directional image data, wherein
      the coded video data represents an image in a format in which first and second portions of image data from opposing fields of view are represented in respective regions of the image,
      a third portion image data from a multi-directional field of view between the opposing fields of view are represented in a third region of the image in a curved projection of the third portion of image data, and
      at least one of the first, second, and third portions of data is a flat projection of its respective portion of an image,
      at least one of the first, second, and third portions of data is a curved projection of its respective portion of the image; and
   formatting the image data to a format for a video sink.

2. The method of claim 1, wherein the coded video also includes a representation of padded image content provided at respective peripheries of the regions.

3. The method of claim 1, wherein the formatting comprises removing padded image content provided at respective peripheries of the regions.

4. The method of claim 1, further comprising storing the decoded image in a reference picture store for use in predictive decoding of later-decoded video data, wherein the stored image has the image format.

5. The method of claim 1, wherein the video sink is a display device for flat image data.

6. The method of claim 1, wherein the video sink is a display device for multi-directional image data.

7. The method of claim 1, wherein the video sink is a computer application.

8. The method of claim 1, wherein the curved projection is a spherical projection is in a cube map format and the curved projection in the third region is a spherical projection of content from the source image.

9. A non-transitory computer readable medium, storing program instructions that, when executed by a processing device, causes the device to:
   decode coded video data representing multi-directional image data, wherein
      the coded video data represents an image in a format in which first and second portions of image data from opposing fields of view are represented in respective regions of the image,
      a third portion of image data from a multi-directional field of view between the opposing fields of view are represented in a third region of the image,
      at least one of the first, second, and third portions of data is a flat projection of its respective portion of an image,
      at least one of the first, second, and third portions of data is a curved projection of its respective portion of the image; and
   format the decoded image data to a format for a video sink.

10. The medium of claim 9, further comprising storing the decoded image in a reference picture store for use in predictive decoding of later-decoded video data, wherein the stored image has the image format.

11. The medium of claim 9, wherein the video sink is a computer application.

12. Apparatus, comprising:
    a video coder having an input for coded image data and an output for decoded image data, the coded image data representing an image in a format in which
       first and second portions of image data from opposing fields of view are represented in respective regions of the image,
       a third portion of the image data from a multi-directional field of view between the opposing fields of view are represented in a third region of the image,
       at least one of the first, second, and third portions of data is a flat projection of its respective portion of an image,
       at least one of the first, second, and third portions of data is a curved projection of its respective portion of the image; and
    an image processor having an input for decoded image data in the image format and an output for image data reformatting to format for a video sink.

* * * * *